(12) United States Patent
Bonnin et al.

(10) Patent No.: US 11,165,633 B2
(45) Date of Patent: Nov. 2, 2021

(54) METHOD AND SYSTEM FOR SECURING DATA TRANSMITTED BY A CONNECTED OBJECT AGAINST ATTACKS AFFECTING A CONTROL CIRCUIT OF SAID OBJECT

(71) Applicant: IDEMIA IDENTITY & SECURITY FRANCE, Courbevoie (FR)

(72) Inventors: Frederick Kurt Louis Bonnin, Issy les Moulineaux (FR); Jean-Yves Pierre Bernard, Issy les Moulineaux (FR); Emmanuelle Dottax, Issy les Moulineaux (FR); Fabien Blanco, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 239 days.

(21) Appl. No.: 16/240,149

(22) Filed: Jan. 4, 2019

(65) Prior Publication Data

US 2019/0215234 A1    Jul. 11, 2019

(30) Foreign Application Priority Data

Jan. 5, 2018 (FR) ...................... 1850080

(51) Int. Cl.
*G06F 15/173* (2006.01)
*H04L 12/24* (2006.01)
(Continued)

(52) U.S. Cl.
CPC ........ *H04L 41/0659* (2013.01); *G06F 21/552* (2013.01); *G06F 21/64* (2013.01);
(Continued)

(58) Field of Classification Search
CPC ... H04L 41/0659; H04L 12/40; H04L 43/045; H04L 43/0847; G06F 21/552; G06F 21/64; G06F 21/85
(Continued)

(56) References Cited

U.S. PATENT DOCUMENTS

2011/0320823 A1    12/2011  Saroiu et al.
2016/0308677 A1*   10/2016  Thom ................... H04L 9/3234
2019/0036946 A1*   1/2019   Ruvio .................... H04W 4/44

FOREIGN PATENT DOCUMENTS

WO    2017/046805 A1    3/2017

OTHER PUBLICATIONS

Preliminary Research Report and Written Opinion received for French Application No. 1850080, dated Aug. 7, 2018, 10 pages (1 page of French Translation Cover Sheet and 9 pages of original document).

* cited by examiner

*Primary Examiner* — Atta Khan
(74) *Attorney, Agent, or Firm* — Womble Bond Dickinson (US) LLP

(57) ABSTRACT

The present invention concerns a method for securing data transmitted by a data source (2) of a connected object (1) against attacks affecting a control circuit (4) of the connected object (1), the connected object (1) also comprising an electronic signature circuit (6) and a communication bus (8) connected to the control circuit (4), connected to the electronic signature circuit (6) and connected to the source (2), wherein the method comprises the following steps implemented by the electronic signature circuit (6):

detecting (602) a first datum (M) transmitted by the source (2) on the communication bus (8);
detecting (606) a second datum (M') to be signed, on the communication bus, the second datum having been
(Continued)

transmitted (404) by the control circuit (4) on the communication bus (8) after detection of the first datum (M) by the control device (4);

verifying (608) coherence between the detected data (M, M'), signalling (610) an error (E), if any, as a function of a result of the verification.

15 Claims, 7 Drawing Sheets

(51) Int. Cl.
*G06F 21/64* (2013.01)
*G06F 21/55* (2013.01)
*G06F 21/85* (2013.01)
*H04L 12/40* (2006.01)
*H04L 12/26* (2006.01)

(52) U.S. Cl.
CPC .............. *G06F 21/85* (2013.01); *H04L 12/40* (2013.01); *H04L 43/045* (2013.01); *H04L 43/0847* (2013.01)

(58) Field of Classification Search
USPC ......................................................... 709/223
See application file for complete search history.

METHOD AND SYSTEM FOR SECURING DATA TRANSMITTED BY A CONNECTED OBJECT AGAINST ATTACKS AFFECTING A CONTROL CIRCUIT OF SAID OBJECT

FIELD OF THE INVENTION

The present invention concerns a method for securing data within a connected object against attacks affecting a control circuit of the connected object.

STATE OF THE ART

A conventional connected object comprises a sensor configured to acquire measurement data, and a communication interface to transmit said measurement data to a remote server. Document WO2017/046805 describes such connected object.

A connected object generally comprises a control circuit configured to request the sensor for receipt of said measurement data, and to transmit said measurement data to the communication interface for retransmission thereof by the latter to the remote server.

The control circuit and the sensor communicate together via a communication bus.

To certify that the data transmitted to the server comes from the connected object, the connected object electronically signs the measurement data before transmission thereof to the server, by means of a secret key specific to the connected object.

Said electronic signing could be implemented by the control circuit itself. However, in many connected objects the control circuit is not secure. This particularly means that the control circuit may be the subject of remote attacks directed from outside the connected object, these attacks taking on the form of data relayed by the communication interface. The author of said attacks could therefore discover the secret key.

It has been proposed to add a secure circuit separate from the control circuit in the connected object. The application of an electronic signature is delegated to this secure circuit. This solution has several advantages compared with the solution whereby the control circuit is modified to make it more secure. First, the secure circuit is less exposed than the control circuit to attack arriving from the communication interface; the secret key is therefore more difficult to discover. Secondly, this solution offers connected object manufacturers, not having particular skills in matters of security, to integrate a secure circuit produced by a third party in one of its products.

However, adding a secure circuit complexifies the internal architecture of the connected object.

One relatively complex modification to architecture would consist in arranging the secure circuit between the control circuit and the sensor, with no direct link between the control circuit and the sensor, as is suggested in document US2016/0308677. In this manner, any measurement data would first be electronically signed by the secure circuit before being transmitted to the control circuit.

Yet, said complex modification could make it difficult to integrate a secure circuit supplied by a third party in a pre-existing connected object.

To limit these architectural complexifying problems through the addition of this secure circuit, it is advantageous simply to connect the secure circuit to the communication bus already existing between the control circuit and the sensor.

However, this particular choice raises a new problem: with said architecture, the secure circuit is not in a position to ensure the authenticity of the measurement data transmitted by the sensor.

SUMMARY OF THE INVENTION

It is therefore one objective of the present invention to improve the resistance of a connected object to attacks intended to compromise certification of data to be transmitted by the connected object, without complexifying the architecture of the connected object significantly.

There is therefore proposed, in a first aspect of the invention, a method for securing data transmitted by a data source of a connected object against attacks affecting a control circuit of the connected object, the connected object also comprising an electronic signature circuit and a communication bus connected to the control circuit, connected to the electronic signature circuit and connected to the source, wherein the method comprises the following steps implemented by the electronic signature circuit:
  detecting a first datum transmitted by the source on the communication bus;
  detecting a second datum to be signed on the communication bus, the second datum having been transmitted by the control circuit on the communication bus after detection of the first datum by the control device;
  verifying coherence between the detected data;
  signalling an error, if any, as a function of the result of verification.

Preferably, the following steps are implemented by the electronic signature circuit:
  detecting a request requesting the source to transmit a datum differing from the first datum;
  inhibiting the request, preventing the request from being processed by the source;
  transmitting a dummy datum on the communication bus in response to the request;
  detecting a third datum to be signed on the communication bus, the third datum transmitted by the control circuit on the communication bus, the third datum having been transmitted by the control circuit on the communication bus after detection of the dummy datum by the control device;
  verifying coherence between the third datum and the previously transmitted dummy datum;
  signalling an error, if any, as a function of the result of verification of coherence between the third datum and the dummy datum.

Preferably, the inhibition comprises: the transmission of an instruction to deactivate the source, or a transmission of an instruction to modify a request destination address memorized by the source to a different value of a destination address contained in the request, or else on-the-fly modification of a destination address contained in the request to a different value of a request destination address of the source.

Preferably, only one portion of the bits of the destination address contained in the request is modified, the modified portion being composed of one least significant bit or several least significant bits of the destination address.

Preferably, the electronic signature circuit implements the following steps:
  detecting a sequence of N consecutive requests requesting the source to transmit data, where $N>1$;
  selecting K requests from among the N detected consecutive requests, where $K<N$;

implementing the inhibition step only on the selected K requests.

Preferably, the selection is random.

Preferably, K=N−1.

Preferably, the method in the first aspect comprises the generation by the electronic signature circuit of the dummy datum from at least one datum previously transmitted by the source.

Preferably, the dummy datum results from modification of only one portion of the bits of the datum previously transmitted by the source, the modified portion being composed of one least significant bit or several least significant bits of the datum previously transmitted by the source.

Preferably, the following steps are implemented by the electronic signature circuit:
- measuring at least one physical characteristic of a signal circulating on the communication bus while the control circuit transmits a datum or request on the communication bus, the physical characteristic being a signal voltage for example or a time period between two predetermined edges of the signal;
- comparing the measured physical characteristic with a predetermined template, and signalling an error, if any, as a function of the result of the comparison between the physical characteristic and the template; or
- calculating a confidence index representing conformity of the measured physical characteristic with the template, and signalling the confidence index.

Preferably, the source is a sensor, and the data transmitted by the sensor are measurement data acquired by the sensor.

There is also proposed, in a second aspect of the invention, an electronic signature circuit configured:
- to be connectable to a communication bus with which a control circuit and a data source of a connected object are also connected;
- to detect a first datum transmitted by the source on the communication bus;
- to detect a second datum to be signed on the communication bus, the second datum having been transmitted by the control circuit on the communication bus after detection of the first datum by the control device;
- to verify coherence between the detected data;
- to signal an error, if any, as a function of verification.

There is also proposed, in a third aspect of the invention, a system for securing data transmitted by a data source of a connected object, the system comprising an electronic signature circuit according to the second aspect of the invention, and a control circuit configured:
- to be connectable to the communication bus;
- to detect the first datum transmitted by the source on the communication bus;
- to transmit on the communication bus the second datum to be signed by the electronic signature circuit.

There is also proposed, in a fourth aspect of the invention, a connected object comprising a data source, a system for securing data transmitted by the source, the system conforming to the second aspect of the invention, and a communication bus, wherein the sensor, the control circuit and the electronic signature circuit are connected to the communication bus.

DESCRIPTION OF THE FIGURES

Other characteristics, objectives and advantages of the invention will become apparent from the following description that is nonlimiting and given solely for illustration purposes, and is to be read in connection with the appended drawings in which.

In all the Figures, same elements carry same references.

DETAILED DESCRIPTION OF THE INVENTION

Figure 1:
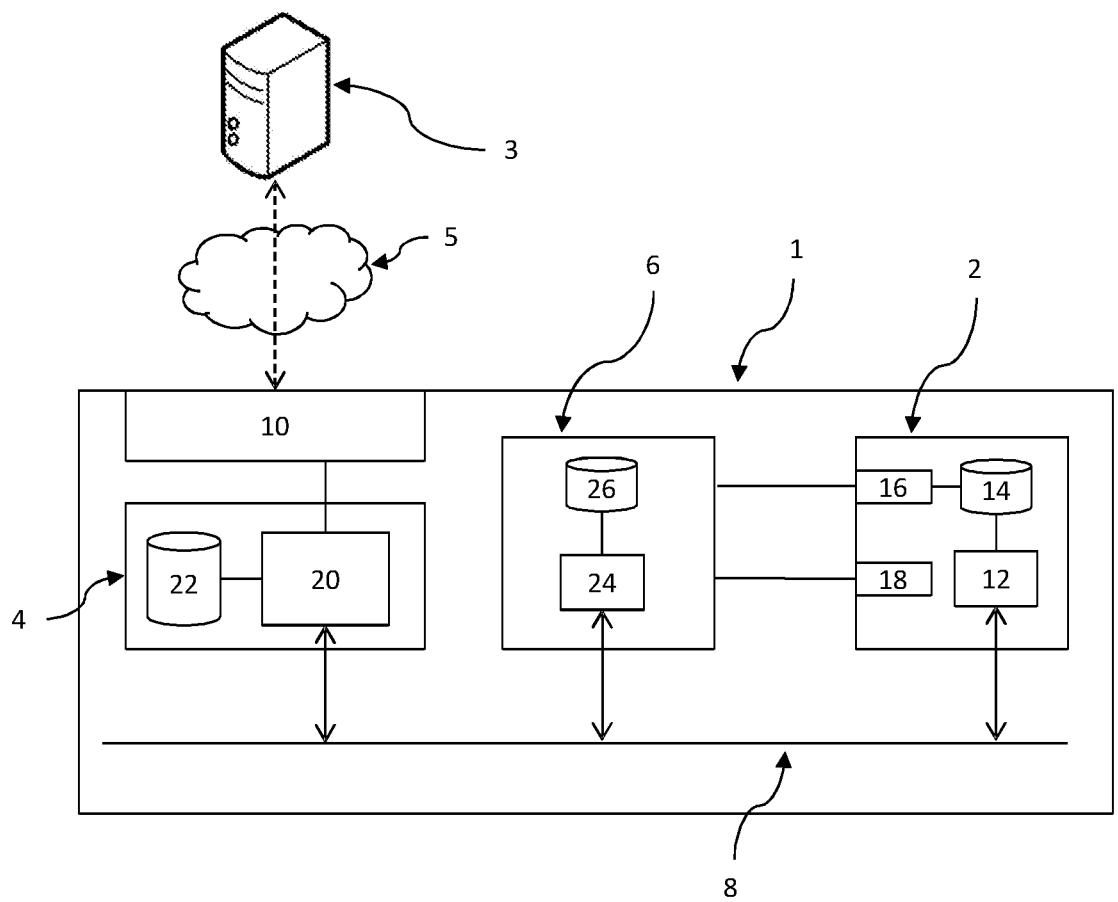
FIG. 1 schematically illustrates a system comprising a connected object and a server according to one embodiment of the invention.
Figure 2:
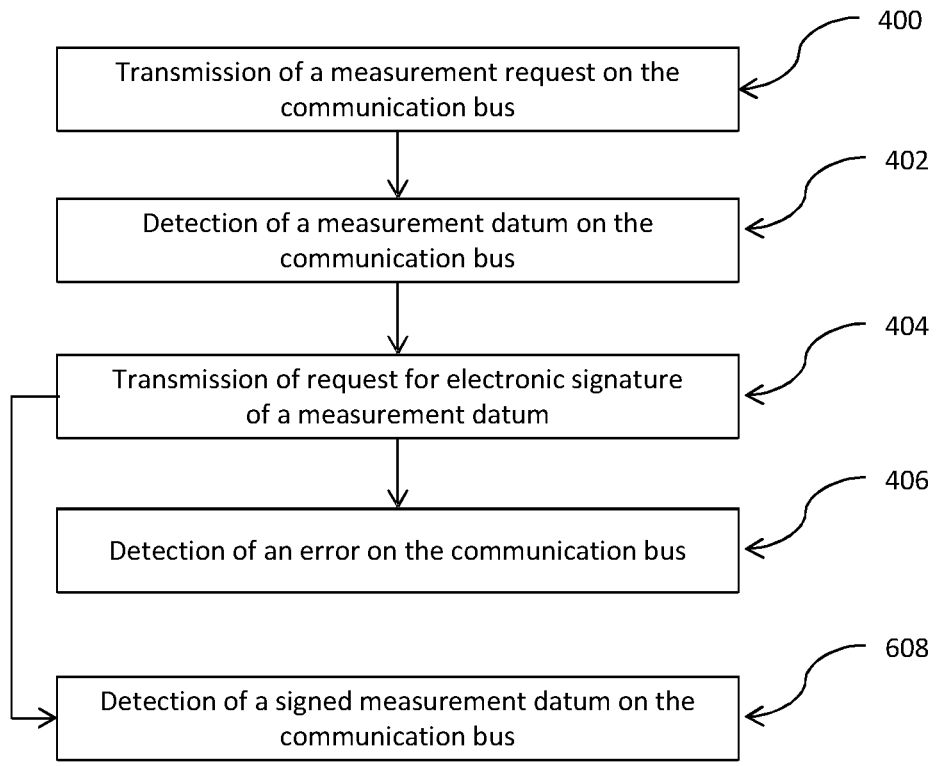
FIGS. 2 to 8 are flowcharts of steps of a method for securing data implemented by the connected object illustrated in FIG. 1.
Figure 3:
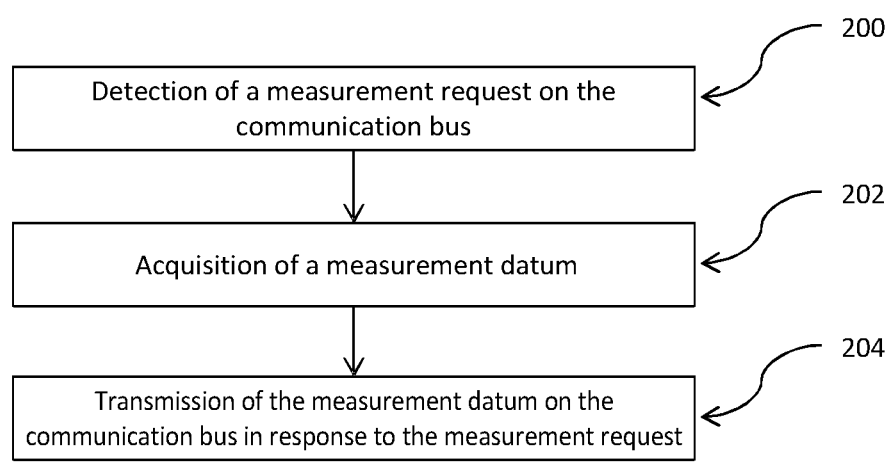
Figure 4:
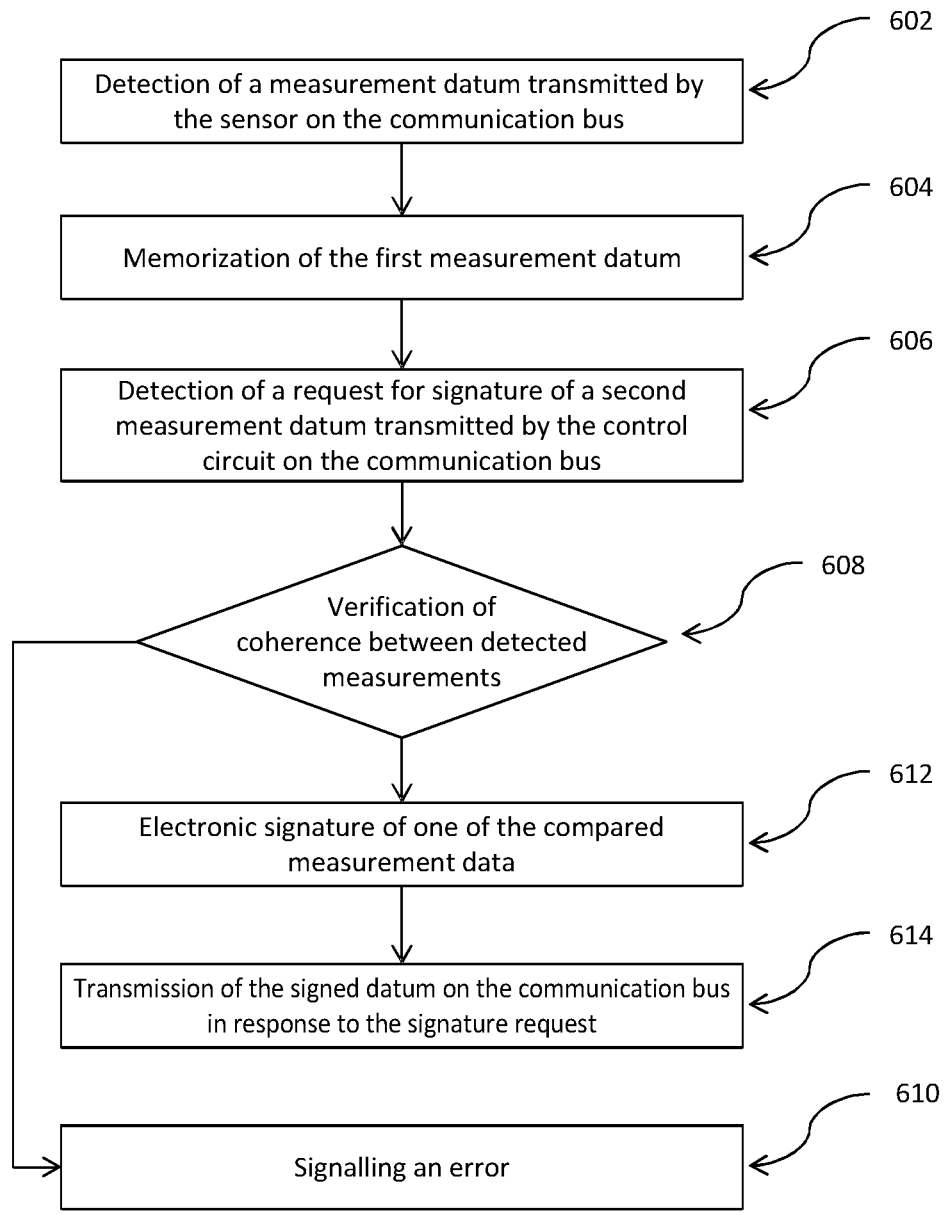

With reference to FIG. 1, a connected object 1 comprises a data source 2, a control circuit 4, an electronic signature circuit 6, a communication bus 8, and a communication interface 10 with a remote server 3.

The data source 2 is connected to the communication bus 8, and is able to transmit data on this bus 8.

In the remainder hereof, it is considered, but not limited thereto, that the data source 2 is a sensor.

The sensor 2 is configured to acquire measurement data representing a physical magnitude e.g. temperatures.

The sensor 2 comprises a measurement processing unit 12 configured to detect and process measurement requests sent from the communication bus 8, and to transmit data on the communication bus 8.

The sensor 2 comprises an internal register 14 in which an address specific thereto is recorded. This address allows a distinction to be made between the sensor 2 and other equipments connected to the communication bus 8.

The sensor 2 may comprise an address modification port 16, allowing an adapted instruction to be received to modify the value of the address memorized in the internal register 12.

The sensor 2 may further comprise a deactivation port 18, and is able to be deactivated or reactivated by suitable signals received on the deactivation port.

The control circuit 4 is also connected to the communication bus 8. It ensures a master role i.e. it is capable of commanding the sensor 2 and the electronic signature circuit 6 by means of requests transiting via the bus 8, as will be seen below.

The control circuit 4 comprises a data processing unit 20, for example at least one processor or at least one microprocessor.

The control circuit 4 is also configured to know the address of the sensor 2. For example, it has a memory 22 in which this address of the sensor 2 is memorized. As a variant, the memory 22 is external to the control circuit.

The electronic signature circuit 6 comprises data processing unit 24 (e.g. at least one processor or at least one microprocessor) configured electronically to sign data acquired by the sensor 2 in the manner described below. In the present text it is considered that an «electronic signature» designates any processing that modifies, marks or completes data so as to certify that the data to be signed were acquired within the connected object 1.

The electronic signature circuit 6 further comprise a memory 26 in which a secret key is stored that can be used to implement said electronic signing.

The electronic signature circuit 6 is connected to the communication bus 8. The electronic signature circuit 6 has an address specific thereto on the communication bus 8. This address allows the signature circuit to be distinguished from other equipments connected to the communication bus 8, and in particular from the sensor 2.

The electronic signature circuit 6 may also comprise an input/output port GPIO connected to the deactivation port of the sensor 2 or to the address modification port of the sensor 2, via a line which is independent of the communication bus 8.

For example, the communication bus 8 is of I²C type (Inter-Integrated Circuit). In manner known per se the bus 8 then comprises a Serial Data Line (SDA), and a Serial Clock Line (SCL). Each of these lines can assume a low state (0) or high state (1).

As previously indicated, the control circuit 4, the sensor 2 and the electronic signature circuit 6 are simultaneously connected to the same communication bus 8 via independent physical links. In other words, the case is excluded in which the control circuit 6 could only communicate with the sensor 2 via the electronic signature circuit 6.

The network communication interface 10 for example is of wireless type, e.g. Wi-Fi, LoRaWan or Bluetooth.

The network communication interface 10 is arranged so that it can communicate within the connected object 1 with the control circuit 4 e.g. via a link which is independent of the communication bus 8. Therefore, the control circuit 4 is able to transmit data to the communication interface 10 for transmission thereof to the server 3, or it can receive data from the communication interface 10 sent by the server 3.

The control circuit 4 is non-secure in the meaning that the control circuit 4 may be the subject of remote attacks from outside the connected object 1, these attacks being in the form of data relayed by the network communication interface 10.

On the other hand, the electronic signature circuit 6 is secure in that it has means to protect against such attack.

With reference to FIGS. 2 to 5, a method implemented by the connected object 1 comprises the following steps.

Figure 5:
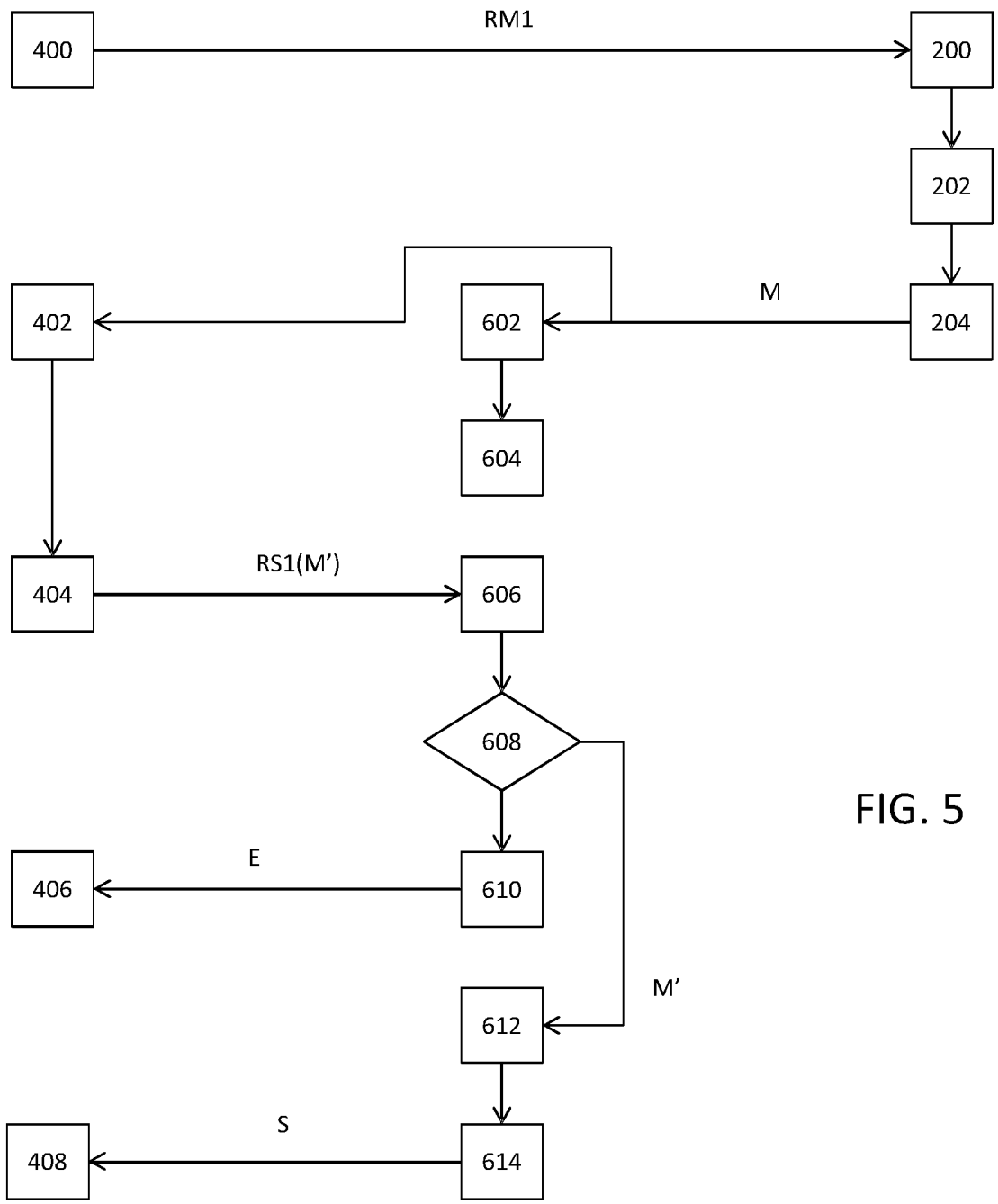
Figure 6:
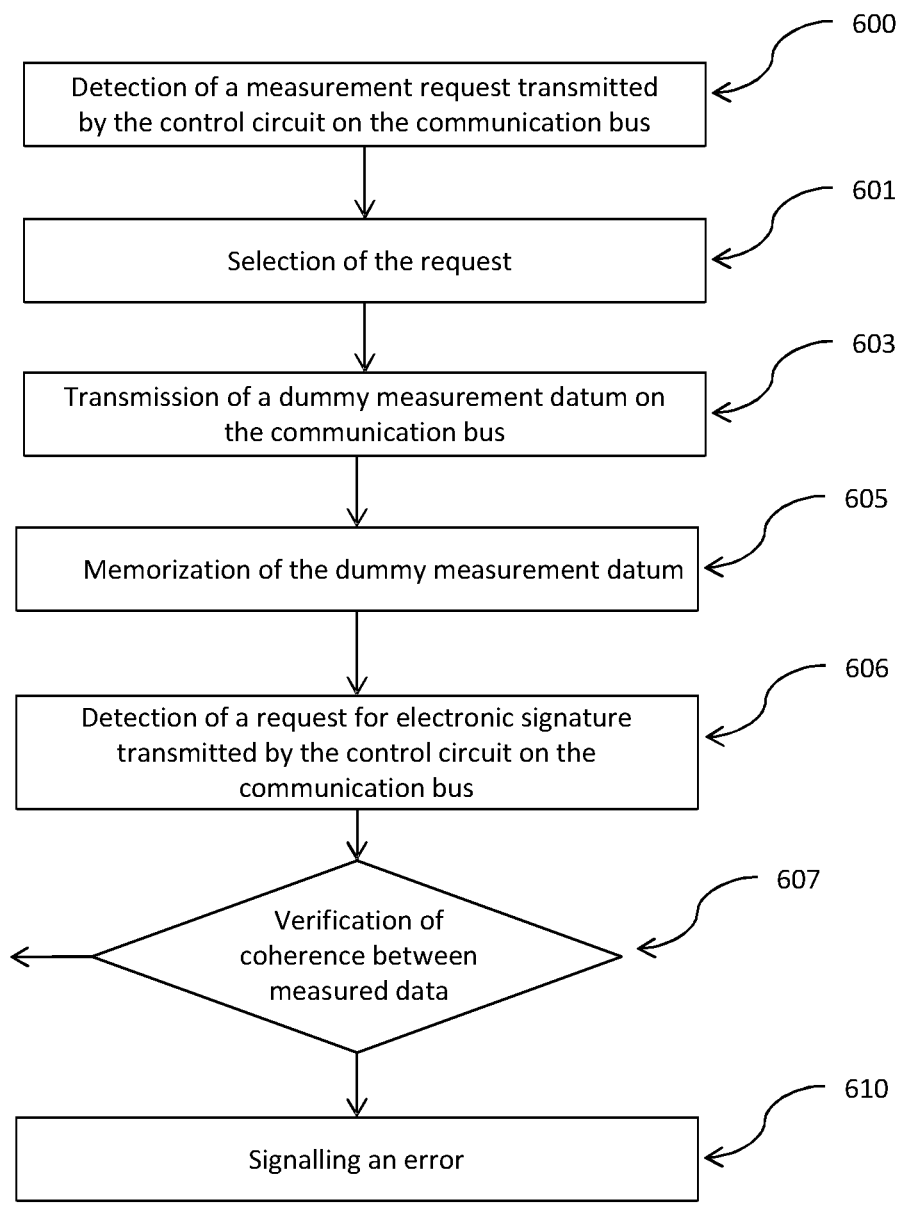
Figure 7:
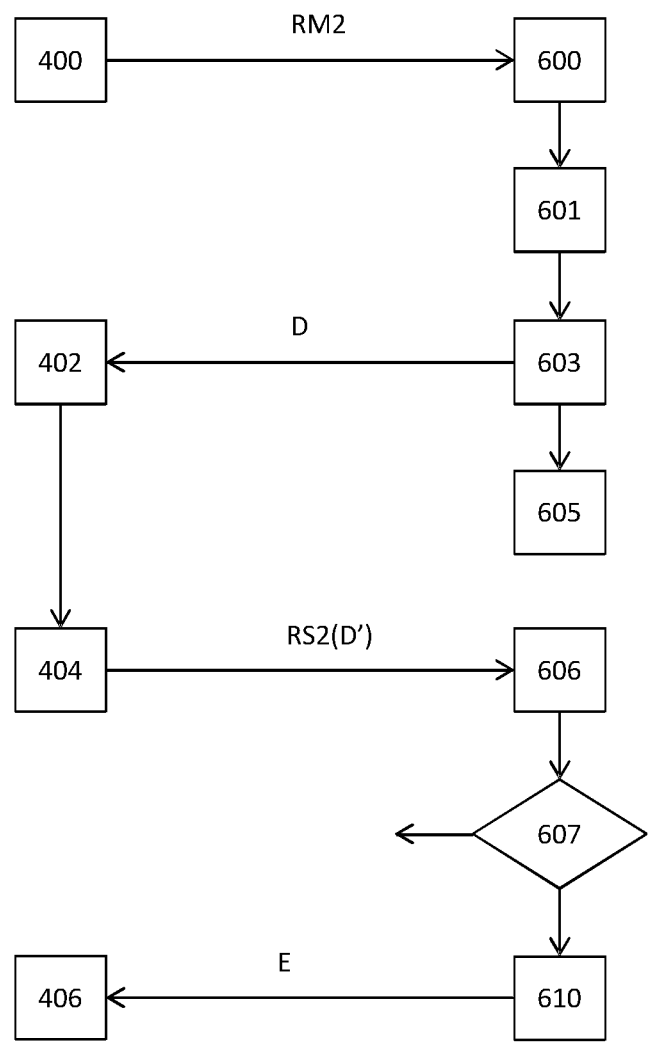
Figure 8:
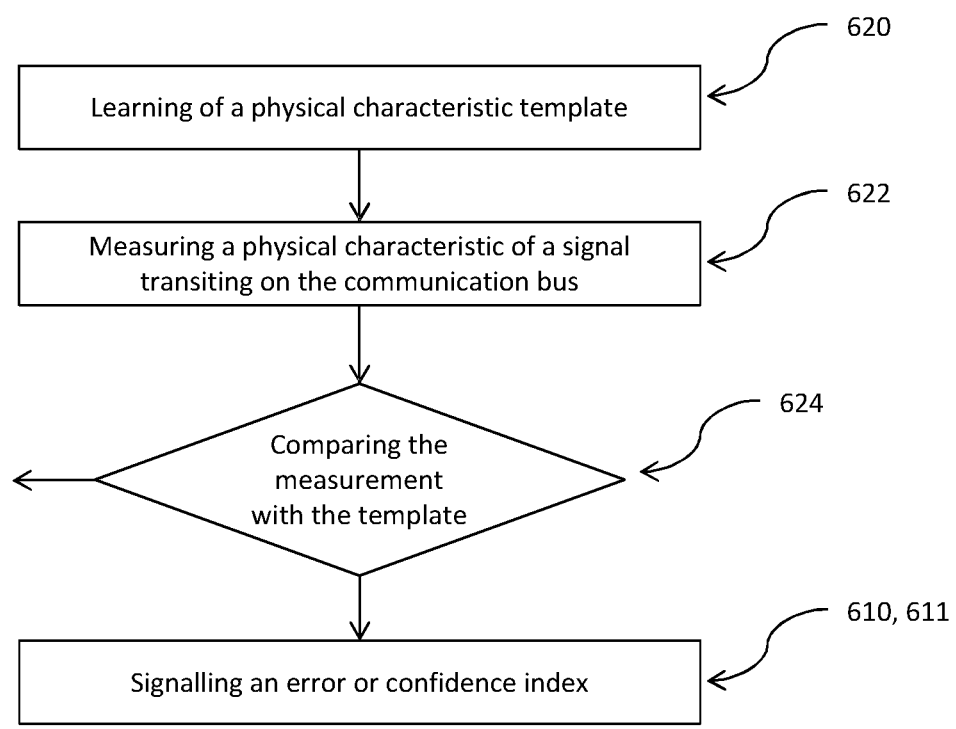

By convention, the steps of the method implemented by a component of the connected object 1 are given number references in these Figures in which the first number corresponds to the number reference of the component implementing the step. For example, the steps illustrated in FIGS. 2, 3 and 4 have references respectively starting with 4, 2 and 6 and are those implemented by the control circuit 4, the sensor 2 and the electronic signature circuit 6 respectively. FIG. 5 gives a more global view of the method showing how the steps implemented by components 2, 4 and 6 of the connected object 1 are coordinated.

The control circuit 4 transmits a first measurement request RM1 on the communication bus 8, requesting the sensor 2 to transmit a measurement datum (step 400).

The first request notably comprises the address specific to the sensor 2, so as to indicate that the first request transmitted on the communication bus 8 is intended to be processed by the sensor 2.

If the communication bus 8 is a I²C bus, this first measurement request RM1 translates as a succession of changes in state of the two bus lines 8, this succession being determined by the I²C communication protocol, known per se.

The sensor 2 detects the first measurement request RM1 transmitted on the communication bus 8 (step 200). During detection 200, the sensor 2 compares the address included in the first measurement request RM1 with the address memorized in its internal register. Since both addresses are identical, the sensor 2 processes the first request. Should the two addresses not be identical, the sensor 2 would infer that the first request is intended for other slave equipment connected to the communication bus 8, and would therefore not process this request.

The processing of the first request by the sensor 2 comprises the acquisition of a first measurement datum M (step 202), and transmission of the acquired datum on the communication bus 8 in response to the first measurement request RM1 (step 204). It is to be noted that acquisition 202 is not necessarily made after receipt of the request; it may have been made before said receipt, asynchronously.

The measurement datum M is transmitted on the bus 8 (step 204) in the form of a response to the first request, the response having a predetermined format. It is not compulsory that this response should include any address of the control circuit 4 in the event that only the control circuit 4 is master on the communication bus 8 (which is assumed to be the case here); the format of the response can be sufficient for the control circuit 4 to understand that it is the intended recipient of this response.

The electronic signature circuit 6 detects the first measurement datum that has transited on the communication bus 8 (step 602).

The electronic signature circuit 6 memorizes in its memory 26 the first measurement datum (step 604).

The control circuit 4 also detects the response that has transited on the communication bus 8 (step 402).

The control circuit 4 then transmits on the communication bus 8 a second measurement datum M' to be electronically signed by the electronic signature circuit 6 (step 404). When the control circuit 4 is in normal state, the second transmitted measurement datum corresponds to the first datum. However, if the control circuit 4 has been attacked, its behaviour can be altered to the extent that the second measurement datum differs from the first measurement datum previously detected by the control circuit 4.

For example, the second measurement datum M' is transmitted in a signature request RS1 also comprising the address of the electronic signature circuit 6, on the communication bus 8.

The electronic signature circuit 6 detects the signature request RS1 that has transited on the communication bus 8 (step 606). If the address of the signature request RS1 contains an address corresponding to its own address, which normally should be the case, the electronic signature circuit 6 processes the signature request RS1; if not, the electronic signature circuit 6 does not process the signature request RS1.

The electronic signature circuit 6 verifies whether or not the second measurement datum M' that it has received and the first measurement datum M that it had previously stored in its memory 26 are coherent (step 608).

Herein it considered that the two data are «coherent» if these two data are related via a predetermined mathematical relation, and «incoherent» if not. This predetermined mathematical relation can be an equality relation in which case verification implemented by the electronic signature circuit 6 at step 608 is a comparison between the two data M and M'. However, a more complex mathematical relation can be verified by the electronic signature circuit at step 608, if for example the control circuit 4 is intended to apply processing to the datum M that it receives.

If the two compared measurement data M and M' are incoherent, this means that the control circuit 4 has corrupted the first measurement datum M that it received at step 402. It is therefore possible that the control circuit 4 has been attacked. As a result, the electronic signature circuit 6 signals an error E in this case (step 610).

For example, the error E is signalled to the control circuit 4, so that the control circuit 4 relays this error E to the server via the network communication interface 10 (step 406).

The error E can be sent up to the server spontaneously by the electronic signature circuit 6 when the two compared measurement data M and M' are incoherent. As a variant, this error E is sent up to the server in response to a request transmitted by the server and received by the connected object via its network communication interface 10.

If the two compared measurement data M and M' correspond, this means that the control circuit 4 has not corrupted the first measurement datum that it received. In this case, no error is signalled.

The electronic signature circuit 6 also applies an electronic signature to the second measurement datum received from the control circuit 4, by means of the secret key memorized in its memory, to produce a signed measurement datum S (step 612).

The signed measurement datum is transmitted by the electronic signature circuit 6 to the control circuit 4 in response to the signature request, via the communication bus 8 (step 614).

The control circuit 4 then triggers transmission of the signed measurement datum S to the server via the network communication interface 10 (step 408). The fact that the measurement datum S has been electronically signed within the connected object 1 is certification for the server that this datum S comes from the connected object 1 and not from another device, or that this datum has not been modified by a device interposed between the server and the connected object 1 to implement a man-in-the-middle attack.

The steps of the method can be repeated for many measurement requests sent to the sensor 2 and sequentially transmitted by the control circuit 4 on the communication bus 8 (by repeating step 400).

One advantage of the preceding method lies in the fact that it is fairly efficiently secured against attacks affecting the control circuit 4. This is because electronic signing is allocated to another component, which is more difficult to bypass via an attack.

Another advantage of this method lies in its ease of implementation. It is very easily implemented on a basic connected object comprising the control circuit, the bus and the sensor, but not comprising any secure component. The sole material modification to be made in said basic connected object is to connect said secure component to the existing communication bus.

However, the preceding method is not protected against some particularly elaborate attacks affecting the control circuit 4. A control circuit 4 that has been the subject of an attack could act on the communication bus 8 so that the first measurement datum M is corrupted when transiting on this bus 8, before being detected by the control circuit 4 at step 402. In the event that the communication bus 8 is a I$^2$C bus for example, the compromised control circuit 4 could impose a given value (e.g. 0 or 1) on the SDA data line, the consequence of which would be that the first measurement datum memorized by the electronic signature circuit 6 would have this imposed value, and also the second measurement datum to be signed transmitted by the control circuit 4. Therefore, the two measurement data M and M' compared by the electronic signature circuit 6 would be identical and no error would be signalled although the control circuit has been attacked.

To prevent missed detection of such attack, and thereby improve the security of the method, the following steps can advantageously be implemented when the control circuit 4 transmits a second measurement request RM2 on the communication bus 8 requesting the sensor 2 to provide another measurement datum (step 400).

The first measurement request RM1 and the second measurement request RM2 are two measurement requests consecutively transmitted by the control circuit 4 on the communication bus 8. The second request RM2 can therefore be a measurement request following after the first request RM1, or else preceding it.

The electronic signature circuit 6 detects the second measurement request RM2 on the communication bus 8 (step 600).

After this detection 600, the electronic signature circuit 6 applies an inhibition processing so as to prevent the second request RM2 from being processed by the sensor 2 (inhibition step 601).

This inhibition step 601 can be implemented in different ways.

In a first variant, the inhibition step 601 comprises the transmission by the electronic signature circuit 6 of an instruction to deactivate the sensor 2 sent to the deactivation port 18. When the sensor 2 receives this deactivation instruction on its deactivation port 18, the sensor 2 changes to a deactivated state in which the sensor 2 is incapable of processing of the second request. For example, this deactivated state is a powered-off state. Alternatively, the deactivation instruction can be sent to a component differing from the sensor 2 but configured to cut off power to the sensor in response to receipt of the deactivation instruction.

In a second variant, the inhibition step 601 comprises on-the-fly modification of the destination address of the second measurement request RM2, to a different value of the address of the sensor 2. When the second request RM2 with a modified address reaches the sensor 2, the sensor 2 considers that it is not the recipient for this second request RM2 since the address contained in this second request RM2 differs from the address memorized in its internal register 14. One advantage of this second variant over the first variant is that it can be implemented when the sensor 2 does not comprise a deactivation port 18.

On-the-fly modification for example can involve modifying only one portion of the bits of the destination address contained in the second request, the modified portion being composed of one least significant bit or several least significant bits of the destination address. For example, the modified portion comprises 3 bits. This second variant is particularly easy to implement when the bus 8 is of I$^2$C type.

In a third variant, the inhibition step 601 comprises transmission of an address modification signal sent to the address modification port of the sensor 2. On receipt of this modification instruction, the sensor 2 modifies the value of the address memorized in its internal register to a value differing from the value inserted by the control circuit 4 in the second request. In this manner, the sensor 2 can only ignore the second request considering that it is not the intended recipient thereof.

The advantage of this third variant is that it further strengthens the security level of the method compared with the second variant. The control circuit 4 that has been the subject of a particularly elaborate attack, by inspecting the state of the communication bus 8, could detect that the control circuit 4 has carried out on-the-fly modification of the address of the request conforming to the second variant.

Irrespective of the variant of inhibition 601 implemented, the sensor 2 is prevented from transmitting a measurement datum, in response to the second request, on the communication bus 8.

In lieu and stead thereof, the electronic signature circuit 6 generates a dummy measurement datum D, and transmits this dummy measurement datum on the communication bus 8 in response to the second request (step 603), so that the control circuit 4 believes that this dummy measurement datum was transmitted by the sensor 2. To do so, the electronic signature circuit 6 uses a response format which imitates the one used by the sensor 2 at step 204.

The electronic signature circuit 6 also memorizes in its memory 26 the dummy measurement datum that it has transmitted on the communication bus 8 (step 605).

Preferably, the dummy measurement datum D is generated from at least one measurement datum previously transmitted by the sensor 2, for example datum M, which will reinforce the credibility of the dummy measurement datum D with the control circuit 4. On other words, it becomes more difficult for the control circuit 4 to realise that the electronic signature device has masqueraded as the sensor 2.

For example, the dummy measurement datum D results from modification of only one portion of the bits of a measurement datum M previously transmitted by the sensor 2, the modified portion being composed of one least significant bit or several least significant bits of the measurement datum M previously transmitted by the sensor 2. This modification only scarcely modifies the previously transmitted datum, which makes the identity theft by the electronic signature circuit 6 at steps 601, 603 practically undetectable by the control circuit 4.

The control circuit 4 detects the dummy measurement datum D transmitted on the communication bus 8 (on new implementation of step 402).

In response to this detection, the control circuit 4 transmits on the communication bus 8 a third measurement datum D' to be electronically signed by the electronic signature circuit 6 (new implementation of step 404). The third measurement datum D' therefore corresponds to the dummy measurement datum D when the control circuit 4 is in normal state, but may not correspond to the dummy measurement datum D' when the control circuit 4 is attacked.

The electronic signature circuit 6 detects the third measurement datum D' (on new implementation of step 606).

In response to this detection, the electronic signature circuit 6 verifies whether or not the detected third measurement datum D' and the dummy measurement datum D that it has memorized in its memory 26 are coherent (step 607). For example, this step 607 is the same as step 608 previously described.

If the two compared measurement data D and D' are incoherent, this means that the control circuit 4 has corrupted the dummy measurement datum D it received. It is therefore possible that the control circuit 4 has been attacked. The electronic signature circuit 6 therefore signals an error E in this case (on new implementation of step 610).

The error E is signalled to the control circuit 4 for example, so that the control circuit 4 relays this error to the server via the network communication interface 10 (on new implementation of step 406).

If the two compared measurement data D and D' are coherent, this means that the control circuit 4 has not corrupted the dummy measurement datum it received. In this case, no error is signalled.

Irrespective of the result of this verification of coherence, the electronic signature circuit 6 does not apply an electronic signature to the third measurement datum received from the control circuit 4, and does not transmit a response to the signature request for the third datum on the communication bus 8. It follows that the control circuit 4 does not transmit any signed version of the dummy measurement datum to the server via the network communication interface 10.

As a variant, the signature circuit applies an electronic signature to one of the two data, for example the one received from the control circuit 4 or the one received from the sensor 2, irrespective of the result of this verification of coherence.

To summarize, for two measurement requests RM1 and RM2 consecutively transmitted by the control circuit 4 addressed to the sensor 2, the control circuit 4 has received one measurement datum M truly transmitted by the sensor 2, and one dummy measurement datum D transmitted by the electronic signature circuit 6 masquerading as the sensor 2.

This principle can be generalized to any sequence of N measurement requests transmitted by the control circuit 4, where N>1.

For example, the electronic signature circuit 6 can detect a sequence of N consecutive measurement requests requesting the sensor 2 to transmit measurement data (by repeating step 600 N times). For each detected measurement request, the electronic signature circuit selects or does not select the measurement request. If the request is selected, the inhibition step 601 is implemented together with step 603 to transmit a dummy measurement datum. If the request is not selected, the electronic signature circuit 6 does not filter the measurement request, and as a result the sensor 2 transmits a true measurement datum in response to the measurement request after detection thereof.

The signature circuit selects K requests to be filtered among the N measurement requests, where K<N.

K can be predetermined or variable. If K is variable, the electronic signature circuit 6 can decide whether or not to select a signature request via random drawing, so that a request is selected with a predetermined probability P (if P=0.5, statistically K≈N/2 is obtained).

To summarize, the control circuit 4 receives N−K measurement data truly transmitted by the sensor 2, and K dummy measurement data transmitted by the electronic signature circuit 6. This logic allows relatively regular spacing of inhibitions operated by the electronic signature circuit 6 over time, and hence the «burying» of true measurement data among the dummy data.

Advantageously, the selecting of K requests is random. This random selection allows further strengthening of the non-detectability by the control circuit 4 of the mechanism which precedes masquerading by the electronic signature circuit 6 as the sensor 2.

Thereafter, the control circuit 4 transmits N signature requests to the electronic signature circuit 6 corresponding to the N responses it has received (whether or not dummy) in an order corresponding to the order in which the N measurement requests were previously transmitted by the control circuit 4. The electronic signature circuit 6 then performs N verifications of coherence in sequence:

N−K verifications of coherence between a measurement datum transmitted by the control circuit 4 and a measurement datum transmitted by the sensor 2;

K verifications of coherence between a datum transmitted by the control circuit 4 and a memorized dummy datum.

The electronic signature circuit 6 knows whether verification of coherence 607 or verification of coherence 608 is to be implemented for a given signature, since it has memorized the order of the measurement requests that it previously filtered (this memorization possibly being obtained using a counter counting the measurement requests transmitted by the control circuit 4). Another manner in which the electronic signature circuit 6 can determine whether or not a signature request it receives concerns a dummy datum, is to make provision so that the dummy data have different values from the values that may be given to the measurement data received from the sensor 2.

Preferably, the electronic signature circuit 6 only implements the signalling step 612 of an error E once the N verifications of coherence have been carried out, in the event that at least one of the verifications of coherence ascertains incoherency between values.

In one embodiment, K=N−1 is chosen. In this case, for N measurement requests consecutively transmitted by the control circuit 4 addressed to the sensor 2, the control circuit 4 receives only one measurement datum truly transmitted by the sensor 2, and N−1 dummy measurement data transmitted by the electronic signature circuit 6 masquerading as the sensor 2. In this manner, each measurement datum transmitted by the sensor is efficiently protected.

The preceding steps are repeated by the electronic signature circuit 6 for other sequences of N consecutive requests.

Evidently, the inhibition implemented by the electronic signature circuit 6 for a given request is intended only to be temporary. When the electronic signature circuit 6, at step 601, decides not to select a measurement request following after measurement request RM2 (and hence not to inhibit this request) provision is made so that the sensor 2 is restored to a state enabling it to process this later non-inhibited request. Therefore, depending on the chosen inhibition variant, it can be provided for this purpose that the signature circuit 6:

transmits an instruction to reactivate the sensor 2;
  transmits an instruction restoring the address memorized in the internal register of the sensor 2 to the value used by the control circuit to request measurements;
  does not perform on-the-fly modification of the address of the measurement request detected at step 600.

The method is advantageously completed by the following additional steps implemented by the electronic signature circuit 6, to detect fraudulent behaviour by the control device 4.

The electronic signature circuit 6 measures at least one physical characteristic of a signal circulating on the communication bus 8 while the control circuit 4 transmits a request on the communication bus 8 (signature request or measurement request).

For instance, this physical characteristic is a voltage of the signal or a time period between two predetermined edges of the signal (typically time periods between edges on the SDA line relative to those on the SCL line), if the communication bus 8 is of I²C type). The measuring step is performed for example by means of an analogue-digital converter of the electronic signature circuit 6 connected to the communication bus 8.

The electronic signature circuit 6 then compares the measured physical characteristics with a predetermined template.

If the measured physical characteristic does not conform to the template, an error is signalled by the electronic signature circuit 6. If it does conform, no error is signalled.

The template can be determined by the electronic signature circuit 6 at a prior learning step in which it is considered that the control circuit 4 is not compromised, and at which the signature circuit acquires signals sent by the bus 8, and prepares the template from these signals. This learning step can be factory-implemented, or it can be triggered on first powering-up of the connected object 1, or when requested by the server. In addition, the template generated by a connected object 1 can optionally be copied into other identical connected objects.

Also, the signature circuit can calculate a confidence index representing a degree of conformity of an acquired measurement with the corresponding template, and can signal this confidence index to the server instead of the error (or in addition thereto).

Said score provides richer information than a simple error. The server consequently has the possibility of taking different action according to the value of the confidence index it receives.

With the sending of a confidence index, the server is additionally capable of taking action (alert or deactivation of connected objects) as a function of the multiple indices collected on different connected objects.

Should the control circuit 4 of the connected object 1 be compromised with strong attacker potential, this same control circuit 4 could be capable of carrying out the same learning on the responses of the electronic signature circuit 6, and thereby imitate the latter in a manner that is non-detectable by the electronic signature circuit 6. To counter said attacker, the electronic signature circuit 6 can modify the characteristics of the signal so that any signals analysed by the control circuit 4 do not represent responses given by the electronic signature circuit 6. The imitations used by the control circuit 4 will then be detected by the electronic signature circuit 6 since they do not have the true characteristics of the signals sent by the electronic signature circuit 6.

The invention claimed is:

1. Method for securing data transmitted by a data source of a connected object against attacks affecting a control circuit of the connected object, wherein the connected object further comprises an electronic signature circuit and a communication bus connected to the control circuit, connected to the electronic signature circuit and connected to the data source, wherein the method comprises the following steps implemented by the electronic signature circuit:

detecting a request requesting the data source to transmit a first datum;
  inhibiting the request to prevent the request from being processed by the data source;
  transmitting a dummy datum on the communication bus in response to the request;
  detecting a second datum to be signed on the communication bus, wherein the second datum has been transmitted by the control circuit on the communication bus after detection of the dummy datum by the control circuit;
  verifying coherence between the second datum and the previously transmitted dummy datum;
  signalling an error or depending on a result of said verification of coherence between the second datum and the dummy datum.

2. The method according to claim 1, wherein inhibiting the request comprises transmitting an instruction to modify a request destination address memorized by the data source to a different value of a destination address contained in the request.

3. The method according to claim 1, wherein inhibiting the request comprises on-the-fly modification of a destination address contained in the request to a different value of a request destination address of the data source.

4. The method according to claim 3, wherein only one portion of the bits of the destination address contained in the request is modified, wherein the modified portion consists of one least significant bit or several least significant bits of the destination address.

5. The method according to claim 1, wherein the electronic signature circuit implements the following steps:
  detecting a sequence of N consecutive requests requesting the data source to transmit data, where N>1,
  selecting K requests among the N detected consecutive requests, where K<N,
  implementing the inhibition step only on the selected K requests.

6. The method according to claim 5, wherein the K requests are randomly selected.

7. The method according to claim 5, wherein K=N−1.

8. The method according to claim 1, comprising generating, by the electronic signature circuit, of the dummy datum from at least one datum previously transmitted by the data source.

9. The method according to claim 8, wherein the dummy datum results from modification of only one portion of the bits of the at least one datum previously transmitted by the data source, wherein the modified portion consists of one least significant bit or several least significant bits of the at least one datum previously transmitted by the data source.

10. The method according to claim 1, comprising the following steps implemented by the electronic signature circuit:
  measuring at least one physical characteristic of a signal circulating on the communication bus while the control circuit transmits a datum or request on the communication bus,
  comparing the measured physical characteristic with a predetermined template, and signalling an error or not depending on a result of the comparison between the physical characteristic and the template; or
  calculating a confidence index representing conformity of the measured physical characteristic with the template, and signalling the confidence index.

11. The method according to claim 10, wherein the physical characteristic of the signal is a voltage or a time period between two predetermined edges of the signal.

12. The method according to claim 1, wherein the data source is a sensor, and the data transmitted by the sensor are measurement data acquired by the sensor.

13. The method according to claim 1, wherein inhibiting the request comprises transmitting transmission an instruction to deactivate the data source.

14. System for securing data for a connected object, wherein the system comprises a data source, a control circuit, an electronic signature circuit and a communication bus connected to the control circuit, connected to the electronic signature circuit and connected to the data source, wherein the control circuit is configured to:
  detect a first datum transmitted by the data source on the communication bus;
  transmit on the communication bus a second datum to be signed by the electronic signature circuit, after detection of the first datum;
and wherein the electronic signature circuit is configured to:
  detect a request requesting the data source to transmit a first datum;
  inhibit the request to prevent the request from being processed by the data source;
  transmitting a dummy datum on the communication bus in response to the request;
  detect a second datum to be signed on the communication bus, wherein the second datum has been transmitted by the control circuit on the communication bus after detection of the dummy datum by the control circuit;
  verify coherence between the second datum and the previously transmitted dummy datum;
signal an error or depending on a result of said verification of coherence between the second datum and the dummy datum.

15. Connected object comprising a system for securing data according to claim 14.

* * * * *